United States Patent
Manz et al.

(10) Patent No.: US 11,807,082 B2
(45) Date of Patent: Nov. 7, 2023

(54) OPTICAL IMPRESSION OF A PDLC VEHICLE PANE THROUGH A COMBINATION OF DARK INNER AND OUTER STACKS

(71) Applicant: SAINT-GOBAIN GLASS FRANCE, Courbevoie (FR)

(72) Inventors: Florian Manz, Aachen (DE); Michael Labrot, Aachen (DE); Jefferson Do Rosario, Aachen (DE); Valentin Schulz, Niederzier (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 429 days.

(21) Appl. No.: 17/042,574

(22) PCT Filed: Feb. 4, 2019

(86) PCT No.: PCT/EP2019/052629
§ 371 (c)(1),
(2) Date: Sep. 28, 2020

(87) PCT Pub. No.: WO2019/185221
PCT Pub. Date: Oct. 3, 2019

(65) Prior Publication Data
US 2021/0016640 A1    Jan. 21, 2021

(30) Foreign Application Priority Data
Mar. 26, 2018   (EP) ...................................... 18163891

(51) Int. Cl.
*B60J 3/00* (2006.01)
*B32B 17/10* (2006.01)
(Continued)

(52) U.S. Cl.
CPC ........... *B60J 3/007* (2013.01); *B32B 17/1011* (2013.01); *B32B 17/10036* (2013.01);
(Continued)

(58) Field of Classification Search
None
See application file for complete search history.

(56) References Cited

U.S. PATENT DOCUMENTS

| 6,055,088 A | 4/2000 | Fix et al. |
| 2004/0169789 A1 | 9/2004 | Mathey et al. |

(Continued)

FOREIGN PATENT DOCUMENTS

| CA | 3 009 447 A1 | 9/2017 |
| CN | 103228594 A | 7/2013 |

(Continued)

OTHER PUBLICATIONS

International Search Report as issued in International Patent Application No. PCT/EP2019/052629, dated Mar. 27, 2019.
(Continued)

*Primary Examiner* — Richard H Kim
(74) *Attorney, Agent, or Firm* — Pillsbury Winthrop Shaw Pittman LLP

(57) ABSTRACT

A vehicle pane, includes successively a) an outer glass pane, b) at least one laminated layer, c) a PDLC layer, including a polymer matrix, in which liquid crystal droplets are embedded, and in each case an electrically conductive layer on both sides of the polymer matrix, d) at least one laminated layer, and e) an inner glass pane. The TL(inside) is in the range from 5 to 46% and the TL(outside) is in the range from 20 to 73% and the TL(outside) is greater than or equal to TL(inside), wherein the TL(inside) is the light transmittance of an inner stack that is formed by the inner glass pane and the layers between the PDLC layer and the inner glass pane,
(Continued)

Figure 1:
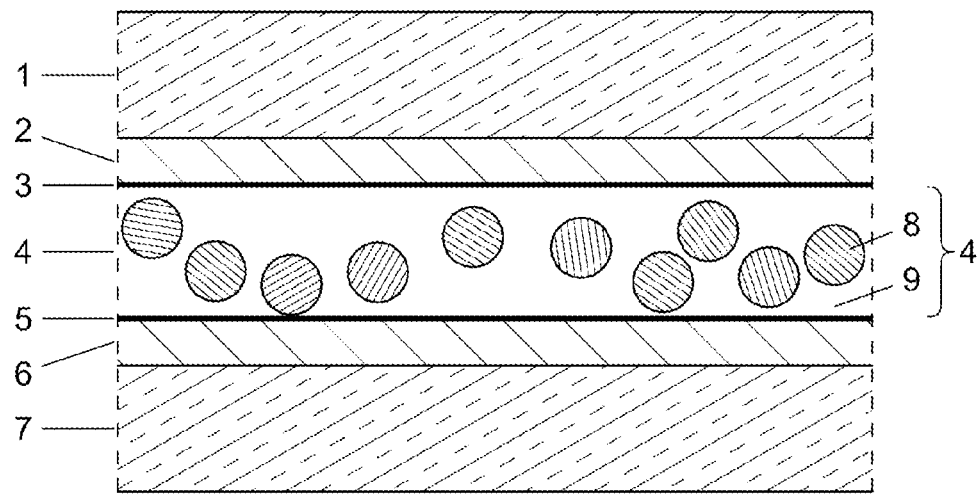

and TL(outside) is the light transmittance of an outer stack that is formed by the outer glass pane and the layers between the PDLC layer and the outer glass pane.

18 Claims, 3 Drawing Sheets

(51) Int. Cl.
  *B60J 1/00* (2006.01)
  *B60J 3/04* (2006.01)
  *G02B 5/20* (2006.01)
  *G02B 5/26* (2006.01)
  *G02F 1/1334* (2006.01)
  *G02F 1/1335* (2006.01)
  *G02F 1/137* (2006.01)

(52) U.S. Cl.
  CPC .... *B32B 17/1077* (2013.01); *B32B 17/10174* (2013.01); *B32B 17/10357* (2013.01); *B32B 17/10504* (2013.01); *B32B 17/10651* (2013.01); *B32B 17/10761* (2013.01); *B60J 1/001* (2013.01); *B60J 3/04* (2013.01); *G02B 5/208* (2013.01); *G02B 5/26* (2013.01); *G02F 1/137* (2013.01); *G02F 1/1334* (2013.01); *G02F 1/133509* (2013.01); *B32B 2605/00* (2013.01); *G02F 2203/055* (2013.01); *G02F 2203/11* (2013.01); *G02F 2203/48* (2013.01)

(56) References Cited

U.S. PATENT DOCUMENTS

| | | | |
|---|---|---|---|
| 2009/0115922 | A1 | 5/2009 | Veerasamy |
| 2015/0298431 | A1* | 10/2015 | Von Der Weiden ......................... B32B 17/10036 156/306.6 |
| 2015/0301366 | A1 | 10/2015 | Gayout et al. |
| 2016/0325529 | A1 | 11/2016 | Linthout et al. |
| 2017/0361576 | A1 | 12/2017 | Legrand et al. |
| 2018/0281570 | A1* | 10/2018 | Labrot ...................... B60J 3/04 |
| 2019/0145161 | A1* | 5/2019 | Agrawal .................. E06B 9/24 359/275 |
| 2019/0255812 | A1* | 8/2019 | Bard ................. B32B 17/10788 |

FOREIGN PATENT DOCUMENTS

| | | |
|---|---|---|
| DE | 100 43 141 A1 | 3/2002 |
| EP | 1 200 256 B1 | 5/2006 |
| EP | 3 106 304 A1 | 12/2016 |
| GB | 2 445 841 A | 7/2008 |
| JP | H01-061238 A | 3/1989 |
| JP | 2015-531701 A | 11/2015 |
| JP | 2017-507874 A | 3/2017 |
| JP | 2017-200856 A | 11/2017 |
| WO | WO 2007/122426 A1 | 11/2007 |
| WO | WO 2007/122429 A1 | 11/2007 |
| WO | WO 2014/023475 A1 | 2/2014 |
| WO | WO 2014/105674 A1 | 7/2014 |
| WO | WO 2014/135467 A1 | 9/2014 |
| WO | WO 2016/029075 A1 | 2/2016 |
| WO | WO 2017/135182 A1 | 8/2017 |
| WO | WO 2017/157626 A1 | 9/2017 |
| WO | WO 2019/185221 A1 | 10/2019 |

OTHER PUBLICATIONS

Examination Report as issued in Indian Patent Application No. 202017041370, dated Jun. 22, 2021.
Notice of Reasons for Rejection as issued in Japanese Patent Application No. 2020-551519, dated Dec. 7, 2021.
Notice of Preliminary Rejection as issued in Korean Patent Application No. 10-2020-7030130, dated Jun. 27, 2023.
Notice of Opposition to a European Patent as filed in European Patent Application No. 19701886.4, dated Mar. 1, 2023.
Details of Berkley Lab Window (Software), osti.gov, Feb. 28, 2023.
Hakemi, H., "Industrial Development of Plastic PDLC: Is There A Future?" Liquid Crystals Toda ,vol. 8, No. 3, (Year: 1998), 7 pages.
Spruce, G., et al., "Polymer dispersed liquid crystal (PDLC) films" Electronics & Communication Engineering Journal, Apr. 1992, pp. 91-100.
Fyles, K. M., "Modern automotive glasses," Glass Technology, vol. 37, No. 1, Feb. 1996, pp. 2-6.
DuPont™ Butacite: PVB Safety Glass Interlayers, product brochure, (Year: 2010), 3 pages.
PRIVA-LITE®—Innovative Solution for Modern Architecture, Product Brochure, Aug. 2016, 12 pages.

* cited by examiner

OPTICAL IMPRESSION OF A PDLC VEHICLE PANE THROUGH A COMBINATION OF DARK INNER AND OUTER STACKS

CROSS-REFERENCE TO RELATED APPLICATIONS

This application is the U.S. National Stage of PCT/EP2019/052629, filed Feb. 4, 2019, which in turn claims priority to European patent application number 18 163 891.7 filed Mar. 26, 2018. The content of these applications are incorporated herein by reference in their entireties.

The invention relates to a PDLC vehicle pane with improved optics.

PDLC layers (PDLC=polymer dispersed liquid crystal) are mostly white films, whose light transmittance can be changed by applying an electrical voltage; in particular, they can be switched between a transparent mode and an opaque mode.

PDLC panes, also referred to as PDLC glass (English: smart glazing) or intelligent glass, are panes that have such a PDLC layer and can, consequently, be switched between a transparent and an opaque mode.

The current market for PDLC panes is in particular for use as windows in the construction industry. Panes of PDLC glass are, however, also of interest for vehicles, in particular for automotive glazing. Here, they can, for example, make the installation of sun visors superfluous.

US 2016/325529 A1 describes a PDLC pane equipped with light emitting elements based on LEDs such that if the user so desires, the brightness on the interior side of the pane can be regulated even when the PDLC layer is activated and, optionally, can be increased. US 2016/325529 A1 also describes the possibility of strong tinting of outer pane components.

WO 2017/135182 A1 describes a PDLC pane in which a layer positioned inward relative to the PDLC layer and a layer positioned outward relative to the PDLC layer are tinted to reduce light and energy transmittance.

However, when using PDLC glass for automotive glazing, special requirements in terms of the optical properties must be taken into account, requiring adjustments.

When, for example, the sun shines on a PDLC glazing, a white veil is produced, hindering a clear view. Integration of a PDLC in a vehicle glazing also increases cloudiness. In particular, white PDLC layers in glazings with high transmittance, e.g., light transmittance above. 70%, as is usually required for windshields and front side windows of vehicles, exhibit distracting haze. In current glass roofs of automobiles, the light transmittance TL(A) is usually between 7% and 25%.

WO 2017/157626 describes a windshield, which comprises an outer pane and an inner pane joined to one another via an intermediate layer, wherein, above a central field of vision with high light transmittance, a functional element with electrically controllable optical properties is embedded in the intermediate layer, which element is connected to the outer pane via a region of a first thermoplastic layer and to the inner pane via a region of a second thermoplastic layer, wherein the region of the first thermoplastic layer and/or region of the second thermoplastic layer is tinted or colored. For the region of the first thermoplastic layer, transmittance of 10% to 50% and in particular 20 to 40% in the visible spectral range is specified as suitable. DE 10043141 A1 by Webasto relates to a vehicle pane system with variable light transmittance that consists of an outer pane, an inner pane, and an element for varying the transparency that is formed by a layer or film that can be subjected to a variable electrical voltage.

WO 2014/023475 A1 describes a switchable composite pane arrangement with two outer panes, an intermediate layer of thermoplastic polymer films, and an SPD (=suspended particle device) film arranged between them. To improve the aging resistance of the arrangement, an edge seal based on polyimide and/or polyisobutylene is proposed in WO 2014/023475 A1. In particular for the vehicle occupants, the following problems arise when using PDLC panes:

transmittance: incident light from outside appears too white/non-transparent even in the transparent mode (switched-on mode) of the PDLC pane, in particular in the corona, when the sun is shining due to reflection inside the vehicle, the PDLC pane also has, viewed from the inside, unsightly white optics ("like cheap plastic"), even when there is no incident light from outside.

The object of the invention is, consequently, to provide a vehicle pane having a PDLC layer having improved optics. In particular, the above described problems in terms of cloudiness (haze) and white veil with incident light from outside and cheap appearance due to reflection in the interior should be alleviated or completely eliminated.

Surprisingly, it was found that this object can be accomplished by specific adjustment of the light transmittance levels of sub-laminates of the PDLC pane and the ratio of these light transmittance levels.

The object could therefore be accomplished by a vehicle pane in accordance with claim 1 and a vehicle in accordance with claim 14. Preferred embodiments of the invention are set forth in the dependent claims.

The invention thus relates to a vehicle pane, that comprises, in this order:
a) an outer glass pane,
b) one or a plurality of laminated layers,
c) a PDLC layer, comprising a polymer matrix, in which liquid crystal droplets are embedded, and in each case an electrically conductive layer on both sides of the polymer matrix,
d) one or a plurality of laminated layers, and
e) an inner glass pane,
characterized in that TL(inside) is in the range from 5 to 46% and TL(outside) is in the range from 20 to 73% and TL(outside) is greater than or equal to TL(inside), wherein TL(inside) is the light transmittance of an inner stack that is formed by the inner glass pane and the layers between the PDLC layer and the inner glass pane, and TL(outside) is the light transmittance of an outer stack that is formed by the outer glass pane and the layers between the PDLC layer and the outer glass pane.

The vehicle pane according to the invention exhibits, compared to prior art PDLC vehicle panes, a significantly improved appearance. In particular, the formation of white veil with incident sunlight is reduced. Furthermore, the PDLC pane gives a visual impression of significantly higher quality; when viewed from the interior, the otherwise usual unsightly white appearance resembling cheap plastic is much less noticeable or even no longer noticeable at all.

The expression "white veil" means the sunlight deflected by the PDLC layer that, similar to a white curtain or a white filter, prevents seeing the object viewed. When very pronounced, the surroundings are visible only vaguely, with all colors reduced to shades of white or gray.

The vehicle pane according to the invention has a PDLC layer. PDLC layers are known and commercially available in a wide variety.

The PDLC layer comprises a polymer matrix, in which liquid crystal droplets are embedded. In addition to the liquid crystal droplets, the polymer matrix can contain other components, e.g., spacers made of a nonconductive material of glass or plastic. The spacers are preferably transparent.

The PDLC layer also has in each case an electrically conductive layer on both sides of the polymer matrix. The PDLC layer is thus formed from two electrically conductive layers with, positioned therebetween, a polymer matrix in which liquid crystal droplets are embedded.

The electrically conductive layers are preferably transparent. The electrically conductive layer can, for example, contain transparent conductive oxides (TCOs). Examples include tin-doped indium oxide (ITO), antimony-doped or fluorine-doped tin oxide ($SnO_2$:F), gallium-doped zinc oxide, or aluminum-doped zinc oxide (ZnO: Al), ITO being preferred. The thickness of the electrically conductive layers based on these transparent conductive oxides (TCOs) is preferably in the range from 10 nm to 2 μm, more preferably 30 nm to 500 nm, and in particular 50 to 100 nm.

The electrically conductive layer can also be a metal layer, preferably a thin layer or a stack of thin layers that include metal layers. Suitable metals are Ag, Al, Pd, Cu, Pd, Pt, In, Mo, Au, Ni, Cr, W. These metal coatings are referred to as TCC (transparent conductive coating). Typical thicknesses of the individual layers are in the range from 2 to 50 nm.

The PDLC layer can, for example, have a thickness from 5 to 40 μm, preferably from 10 to 25 μm.

The electrically conductive layers of the PDLC layer form electrodes that are in contact with the polymer matrix. In the pane according to the invention, the electrically conductive layers are implemented such that they can be connected to a voltage source that can be switched on and off. Without an electric field, the liquid crystal droplets of the polymer matrix are not aligned, resulting in the cloudy or opaque mode of the panes. This is the switched-off or opaque mode. Upon application of an electric field, the liquid crystal droplets are aligned in the same direction and the PDLC layer becomes transparent. This is the switched-on or transparent mode. The operation is reversible.

In a preferred embodiment, the vehicle pane includes in each case a protective layer, arranged on both sides of the PDLC layer and in which the PDLC layer is embedded. The PDLC layer is then situated between the two protective layers. As a rule, a PDLC layer is provided on both sides with the protective film or a carrier film, from which these optional protective layers are formed in the vehicle pane. The protective films or carrier films for the PDLC layer serve for protection and better handling. However, it is also possible to use the PDLC layers without such protective layers.

In this application, these optional protective layers are considered as part of the inner stack or outer stack defined in the following and not as part of the PDLC layer. The protective layers can optionally be used for the adjustment of the optical properties of the inner stack and the outer stack described later.

Apart from the PDLC layer, customary appropriate films for the layers contained in the vehicle pane are used for production.

The protective layers are preferably polymeric layers. Preferably, they contain at least one thermoplastic polymer. The two protective layers can be the same or different. The protective layers can contain, for example, polyethylene terephthalate (PET), ethylene vinyl acetate (EVA), polyvinyl butyral (PVB), polypropylene, polycarbonate, polymethyl methacrylate, polyacrylate, polyvinyl chloride, polyacetate resin, casting resin, acrylates, fluorinated ethylene-propylenes, polyvinyl fluoride ethylene tetrafluoroethylene, or mixtures thereof. The protective layers are particularly preferably PET layers. This is particularly advantageous in terms of stabilizing the PDLC layer.

The thickness of each protective layer, in particular of a PET protective layer, can be, for example, in the range from 0.1 mm to 1 mm, preferably from 0.1 mm to 0.2 mm.

A composite made of two protective films with a PDLC layer arranged therebetween can be used for the installation in the vehicle pane according to the invention.

The vehicle pane according to the invention is a composite glass pane which contains the PDLC layer as a functional layer and, optionally, the protective layers arranged above and below it as described above. In addition, the vehicle pane includes an outer and an inner glass pane that are laminated by one or a plurality of laminating films on both sides of the functional layer to form a solid composite.

In the context of the invention, the term "inner glass pane", also called "inner pane", refers to the glass pane that, when installed in a vehicle, is intended as the pane of the vehicle pane facing the vehicle interior. "Outer glass pane", also called "outer pane", refers to the glass pane that, when installed the vehicle, is intended as the pane facing the external environment.

The inner glass pane and the outer glass pane can be made of the same material or of a different material. The panes can be made of inorganic glass and/or organic glass (polymers). In a preferred embodiment, the inner glass pane and/or the outer glass pane contains glass and/or polymers, preferably flat glass, quartz glass, borosilicate glass, soda lime glass, alkali aluminosilicate glass, polycarbonate, and/or polymethacrylate. The inner glass pane and the outer glass pane are preferably made of soda lime glass.

The inner glass pane and the outer glass pane can have the same thickness or different thicknesses. Preferably, the inner glass pane and the outer glass pane have, independently of each other, a thickness in the range from 0.4 to 5.0 mm, e.g., 0.4 to 3.9 mm, more preferably 1.6 to 2.5 mm. For mechanical reasons, the outer pane is preferably thicker or the same thickness as the inner pane.

The inner glass pane and/or the outer glass pane can be clear or tinted. Tinted glass panes are preferably gray or dark gray. The specific selection of the optical properties of the panes can be used for the adjustment according to the invention of the optical properties of the vehicle pane, as described in the following.

The inner glass pane and/or the outer glass pane can have additional suitable coatings known per se, e.g., non-stick coatings, tinted coatings, anti-scratch coatings, or low-E-coatings. One example of coated glass is low-E glass (low-emissivity glass). Low-E glasses are commercially available and are coated with one or a plurality of metal layers. The metal coating is very thin, e.g., it has a thickness of approx. 10 to 200 nm, e.g., approx. 100 nm. When a coated glass is used as an inner and/or outer glass pane, the coating is preferably situated on the interior side of the glass pane relative to the vehicle pane.

In a preferred embodiment, the inner glass pane and/or the outer glass pane has a low-E coating, particularly preferably with only the inner glass pane having a low-E coating.

The vehicle pane further includes in each case, between the outer glass pane and the PDLC layer or the protective layer and between the inner glass pane and the PDLC layer or the protective layer, one or a plurality of laminated layers, in particular polymeric laminated layers. Preferably, the laminated layers contain a thermoplastic polymer. The following information applies, independently, to all of these one or a plurality of laminated layers, unless otherwise indicated. The laminated layers can be the same or different.

Usually, such commercially available laminating films are used as the starting material for forming the laminated layers. They are used to bond or laminate the components of the vehicle pane to obtain the adhesive glass composite.

The laminated layer can, for example, contain polyvinyl butyral (PVB), ethylene vinyl acetate, polyurethane, polypropylene, polyacrylate, polyethylene, polycarbonate, polymethyl methacrylate, polyvinyl chloride, polyacetate resin, casting resin, acrylates, fluorinated ethylene propylene, polyvinyl fluoride, and/or ethylene tetrafluoroethylene and/or a mixture and/or a copolymer thereof. Preferably, the laminated layer contains polyvinyl butyral (PVB), ethylene vinyl acetate, polyurethane, and/or mixtures thereof and/or copolymers thereof, with PVB laminated layers preferred.

The laminated layers, preferably PVB laminated layers, preferably have a thickness from 0.1 to 1.5 mm, more preferably from 0.3 to 0.9 mm.

In addition to the above-mentioned polymeric laminated layers, the vehicle pane can optionally have one or a plurality of additional functional layers, in particular polymeric functional layers between the inner and outer glass pane. Examples include acoustic films and IR-reflective films or the acoustic layers or IR-reflecting layers formed therefrom. IR is, as usual, an abbreviation for infrared. If other functional layers are contained in addition to the laminated layers, the functional layers are preferably arranged between two laminated layers. The layers arranged closest to the inner and outer glass pane are generally laminated layers.

The functional layers have, for example, in each case, a thickness in the range from 0.04 to 1.5 mm, preferably 0.1 to 1.5 mm, more preferably from 0.3 to 0.9 mm.

Acoustic layers are, for example, constructed from multiple, e.g., three, PVB layers, with a softer PVB layer in the middle. Since the acoustic layers are also suitable as laminated layers, they can serve a dual function.

IR-reflective layers are, for example, formed by a polymeric carrier layer and an IR-reflective coating situated thereon. The polymeric carrier layer can, for example, be formed from form polyester, polycarbonate, cellulose acetate, acrylate, or polyvinyl chloride, with a PET carrier layer preferred. The IR-reflective coating can, in principle, be formed in different ways and preferably includes at least one silver layer. Generally common are multilayers with one or a plurality of silver layers as the actual functional layer, which are embedded between metallic and/or dielectric layers.

In a preferred embodiment, at least two laminating layers are included between the outer glass pane and the PDLC layer, and arranged between the two laminated layers is an IR-reflective layer consisting of a polymeric carrier layer and an IR-reflective coating situated thereon.

The laminated layers, preferably PVB laminated layers, as well as optionally used functional layers and protective layers, in particular PET layers, can be transparent, colorless, or tinted. Tinted layers are preferably gray layers. Such films are available commercially.

Essential to the invention is an adjustment of the optical properties of subcomponents of the vehicle pane, in particular the specific adjustment of the light transmittance of certain subcomponents. Considered to be subcomponents are those obtained by separating the full stack (vehicle pane) at the level of the PDLC layer into an inner stack and an outer stack; with the PDLC layer belonging either to the inner stack nor to the outer stack. The following definitions apply here:

"Outer stack" means the subcomponent of the vehicle pane that is formed by the outer glass pane and the layers between the PDLC layer and the outer glass pane. The protective layer on the side of the PDLC layer facing the outer pane is thus part of the outer stack, together with the outer glass pane and the layers therebetween.

"Inner stack" means the subcomponent of the vehicle pane that is formed by the inner glass pane and the layers between the PDLC layer and the inner glass pane. The protective layer on the side of the PDLC layer facing the inner pane is thus part of the inner stack, together with the inner glass pane and the layers therebetween.

"TL(inside)" is the light transmittance of the inner stack.
"TL(outside)" is the light transmittance of the outer stack.
"TL(total)" is the light transmittance of the entire vehicle pane in the switched-on mode, i.e., in the transparent mode of the PDLC layer. "TL(outside)/TL(inside)" is the ratio of TL(outside) to TL(inside).

The "light transmittance level" refers to the transmittance in the visible spectral range and is expressed here as a percentage. In particular, "light transmittance level" means the light transmittance per the Standard ECE R43 Revision 4 dated Apr. 3, 2017, Illuminant Type A, which is also abbreviated as TL or TL(A). For determination of TL(inside) and TL(outside), the respective partial stack can be laminated and measured, for example, on a clear glass (e.g., the glass type PLC® from Saint-Gobain, which has a light transmittance level of 91% at a thickness of 2.1 mm) as a support carrier, with the contribution of the support carrier to the transmittance level deducted after the measurement. Alternatively, for determination of TL(inside) and TL(outside), the respective partial stack can be laminated onto a release film (e.g., a polyethylene (PE) release film) and the partial stack obtained measured after peeling off the release film. TL(total) is measured where the PDLC is also included. The TL(inside) and TL(outside) measurement is done at points located above or below the PDLC layer in the finished state.

The following relationships apply according to the invention:

TL(inside) is in the range from 5 to 46%, preferably 7 to 28%.

TL(outside) is in the range from 20 to 73%, preferably 24 to 40%.

TL(outside) is greater than or equal to TL(inside), with TL(outside) preferably greater than TL(inside), with TL(outside)/TL(inside) preferably not more than 5. The ratio TL(outside)/TL(inside) is preferably in the range from 5 to 1, preferably in the range from 4 to 1.5, more preferably in the range from 3.5 to 1.8, and even more preferably in the range from 3 to 2.

With the ratio TL(outside)/TL(inside) set as indicated above, particularly advantageous optics can be obtained.

TL(total) in the switched-on mode, i.e., PDLC layer in the transparent mode, is preferably less than or equal to 30%, more preferably less than 20%, and particularly preferably less than 10%, and is preferably greater than 1%, more preferably greater than 2%. Most preferred is TL(total) in the range from 3 to 8%.

The ratio TL(outside)/TL(inside) must be greater than or equal to 1, preferably greater than 1. In order to obtain an optically appealing product in terms of transmittance and reflection from the inside and the outside, both stacks must be dark, whereby the inner stack should be darker. Due to the dark outer stack, the sunlight on the PDLC layer is, in particular, reduced such that the amount of scattered light is reduced and white veil formation is significantly reduced. This also has a major influence on the intensity of the corona. A dark inner stack reduces, in particular, the effect that the PDLC layer glows white when viewed from the inside.

The integration of dark layers in the vehicle pane is is quite advantageous for the visual impression. Here, it is important to arrange dark layers on the outer and inner side of the PDLC layer in order to achieve a good overall impression. In particular, the above-mentioned TL(outside)/TL(inside) ratio significantly improves the visual impression inside the vehicle, in particular a car, in many situations.

The adjustment of the above-mentioned optical properties can be achieved through suitable selection of the individual components belonging to the inner and the outer stack, for which tinted or dark glass panes, tinted or dark laminated layers, protective layers, and/or other functional layers can be used in a mutually coordinated manner.

Thus, for example, one or a plurality of the following measures can be taken for darkening or reducing the light transmittance level of the outer stack, starting from the otherwise usual use of largely transparent components:
  Use of a dark glass pane as the outer glass pane
  Use of a dark coating on the outer glass pane
  Use of a dark PVB film, in particular for the laminated layer
  Use of a dark PET film or a dark coating on a PET film, as an additional layer or as an IR-reflective layer.
  Use of a dark PET film as a protective layer for the PDLC layer.

For darkening or reducing the light transmittance level of the inner stack, one or a plurality of the following measures can be taken, for example, starting from the otherwise usual use of largely transparent components:
  Use of a dark PET film as a protective layer for the PDLC layer.
  Use of a dark PVB film, in particular for the laminated layer
  Use of a dark glass pane as the inner glass pane
  Use of a dark coating on the the inner glass pane (e.g., a dark low-E coating).

In a preferred embodiment, at least one of the laminated layers is a tinted laminated layer, in particular a tinted PVB layer, with the tinted laminated layer preferably being a gray laminated layer.

In a preferred embodiment, the inner glass pane and/or the outer glass pane are selected from tinted glass panes, wherein the tinted glass pane is preferably a gray or dark gray glass pane.

In a preferred embodiment, the inner glass pane is a tinted glass pane and the outer glass pane is a clear glass pane. In another preferred embodiment, the inner glass pane is a tinted glass pane and the outer glass pane is a tinted glass pane, wherein the tinted glass panes are preferably gray or dark gray glass panes.

In a preferred embodiment, the PDLC layer is sealed laterally with an adhesive sealant and/or a thermoplastic strip. It is advantageous that the adhesive sealant and/or the thermoplastic strip protects the PDLC layer against corrosion. It goes without saying that "laterally" refers to the side surfaces of the PDLC layer as opposed to the upper and lower side of the PDLC layer.

The adhesive sealant can, for example, be a polyvinyl butyral (PVB) adhesive sealant and/or be implemented in the form of a frame. In the frame technique, the PDLC layer does not extend all the way to the edge of the vehicle pane, i.e., it is smaller than the vehicle pane in terms of area. The remaining free edge is sealed all around by the adhesive sealant, which has the same thickness as the PDLC layer and thus also functions as a spacer. In this manner, the PDLC layer is laterally framed by the adhesive sealant.

The thermoplastic strip is a tape without adhesive that is attached in a U-shape around the side surfaces of the PDLC layer such that the legs of the U are positioned on the upper and lower side of the PDLC layer.

The PDLC layer can thus extend over the entire surface of the entire vehicle pane or be partially surrounded by a picture frame. In the partial surface arrangement, the PDLC layer is preferably situated in the central region of the vehicle pane when viewed from above, wherein the surface area of the PDLC layer preferably makes up at least 30%, more preferably at least 50%, and even more preferably at least 70% of the surface area of the vehicle pane.

Frequently, in vehicle panes, only part of the pane is transparent. In the case of a roof panel, for example, in some cases only 30% of the pane can be transparent. The rest of the pane is, for example, darkened behind the vehicle headliner (fabric) or by a black print on the pane. As a rule, it is preferable to equip 100% of the through-vision region of the vehicle pane with the PDLC layer.

The vehicle pane according to the invention is suitable for all vehicles, e.g., motor vehicles, trains, watercraft, or aircraft, with motor vehicles particularly preferred. Examples of suitable motor vehicles are buses, tractors, trucks, and passenger cars, with passenger cars particularly preferred.

In a preferred embodiment, the vehicle pane is a sliding roof panel, a glass roof, a rear window, a rear side window, or a front side window, preferably in a motor vehicle. Since the vehicle pane is relatively dark, it is not generally suitable as a windshield.

The invention also relates to a vehicle, including at least one vehicle pane according to the invention, the vehicle preferably being a motor vehicle. Suitable and preferred vehicles are mentioned above.

The invention is further explained in the following using non-restrictive exemplary embodiments with reference to the attached drawings.

Figure 2A:
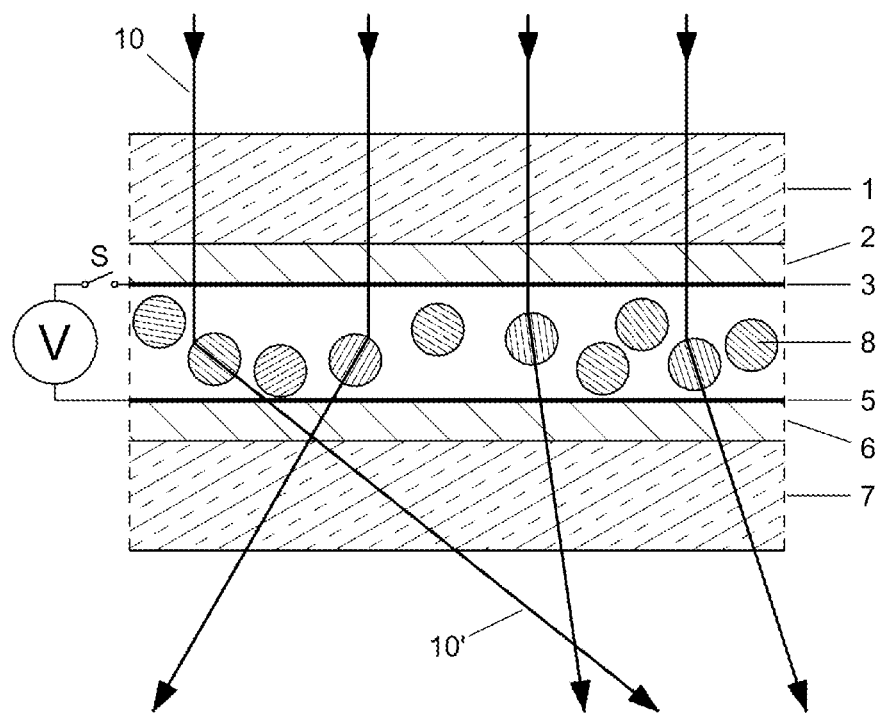
Figure 2B:
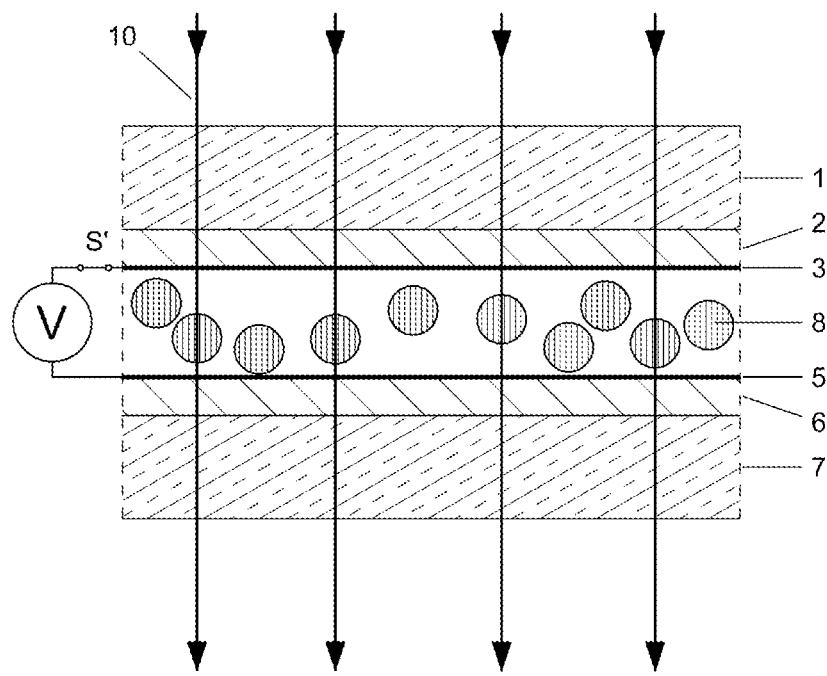
Figure 3:
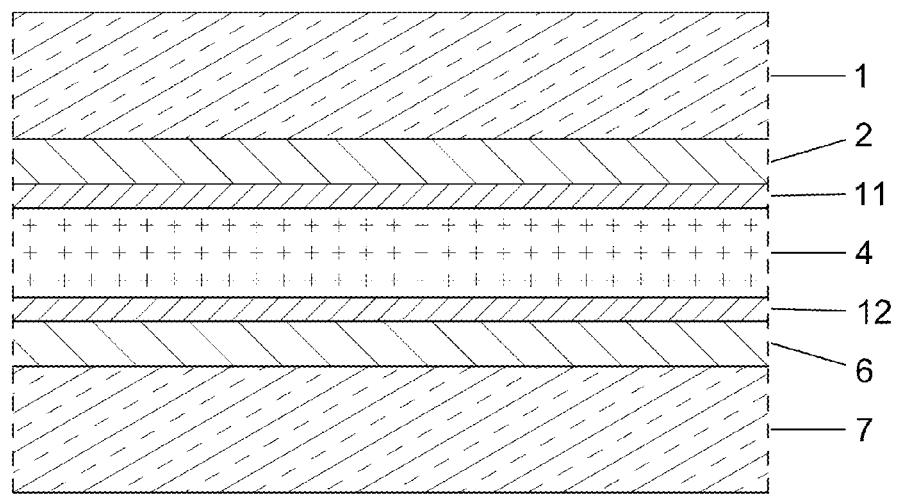
Figure 4:
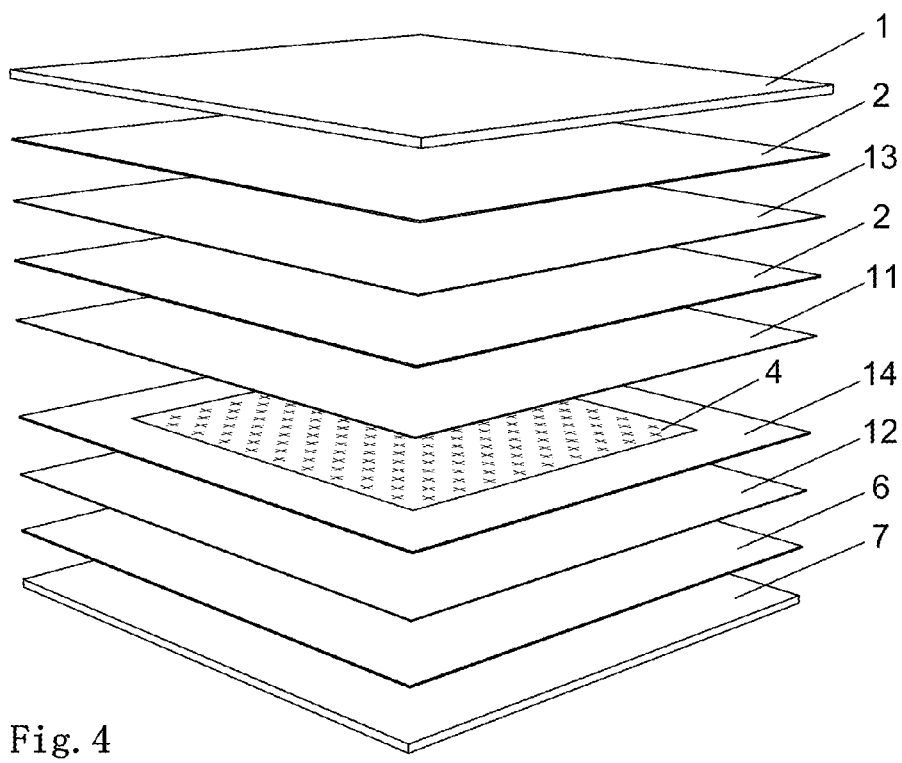

The invention is explained in the following and in the attached drawings. They depict:

FIG. 1 a schematic representation of a vehicle pane according to the invention with a PDLC layer in cross-section;

FIG. 2a-b a schematic representation of a vehicle pane with a PDLC layer in cross-section in the cloudy or opaque mode (switched-off mode, FIG. 2a) and in the transparent mode (switched-on mode, FIG. 2b);

FIG. 3 a schematic representation of another vehicle pane according to the invention with a PDLC layer in cross-section;

FIG. 4 a schematic exploded view of another vehicle pane according to the invention with a PDLC layer.

FIG. 1 depicts schematically a vehicle pane according to the invention in cross-section with an outer glass pane 1, a laminated layer 2, a PDLC layer 4, a laminated layer 6, and an inner glass pane 7. The PDLC layer 4 is formed from two electrically conductive layers 3 and 5 and a polymer matrix 9 arranged therebetween, in which liquid crystal droplets 8 are embedded. The laminated layers 2 and 6 can be formed in each case from a PVB film. The electrically conductive layers 3, 5 of the PDLC layer can be transparent ITO coatings. In the vehicle pane depicted, TL(inside) is in the range from 5 to 46%, TL(outside) is in the range from 20 to 73%, and TL(outside) is greater than or equal to TL(inside).

FIGS. 2a and 2b depict the mode of operation of the PDLC technology on a vehicle pane per FIG. 1. The pane is connected to a voltage source V via the two electrically conductive layers 3 and 5. Using a switch S/S', the circuit can be closed (ON-mode, S') and opened (OFF-mode, S). In the ON-mode (switched-on or transparent mode), an electrical field is applied, the liquid crystals 8 align themselves in an orderly manner, and incident light 10 is hardly scattered, yielding a transparent PDLC layer (FIG. 2b). When the electric current is switched off (switched-off or opaque mode), the electric crystals 8 are aligned randomly such that incident light 10 is scattered 10' and the PDLC layer and the pane become opaque or nontransparent (FIG. 2a).

FIG. 3 depicts schematically another vehicle pane according to the invention in cross-section with an outer glass pane 1, a laminated layer 2, a protective layer 11 for the PDLC layer, a PDLC layer 4, a protective layer 12 for the PDLC layer, a laminated layer 6, and an inner glass pane 7. The laminated layers 2 and 6 can, in each case, be formed from a PVB film. The protective layers 11 and 12 can, in each case, be formed from a PET film. The electrically conductive layers 3, 5 of the PDLC layer can be transparent ITO coatings. In the vehicle pane depicted, TL(inside) is in the range from 5 to 46%, TL(outside) is in the range from 20 to 73%, and TL(outside) is greater than or equal to TL(inside).

FIG. 4 depicts a schematic exploded view of another vehicle pane according to the invention in cross-section with the following layers in this order:

Outer glass pane 1 with a thickness of 2.1 mm made of clear glass, laminated layer 2 with a thickness of 0.38 mm made of clear PVB, IR-reflective layer 13 made of a PET film, with IR-reflective coating laminated layer 2 with a thickness of 0.38 mm made of gray PVB, protective layer 11 for the PDLC layer PDLC layer 4, incorporated with a frame 14 made of PVB, thickness PDLC layer+protective layers 11 and 12: 0.44 mm, protective layer 12 for the PDLC layer, laminated layer 6 with a thickness of 0.38 mm made of clear PVB, inner glass pane 7 with a thickness of 2.1 mm made of gray glass with low-E coating.

In the vehicle pane depicted, TL(inside) is in the range from 5 to 46%, TL(outside) is in the range from 20 to 73%, and TL(outside) is greater than or equal to TL(inside).

EXAMPLES

Seven vehicle panes A-G according to the invention and, as a reference, two vehicle panes H and I not according to the invention were investigated with regard to optical properties. In all examples, the same PDLC film was used together with two PET protective films arranged thereon. The components of the vehicle panes are listed below, with the order of the information corresponding to the structure from the outside (outer glass pane) to the inside (inner glass pane):

Vehicle pane A (2× VG10)
Dark gray glass/clear PVB/PDLC/clear PVB/dark gray glass Vehicle pane B (2× VG10, Comfortsky®)
Dark gray glass/clear PVB/PDLC/clear PVB/dark gray glass+low-E coating (Comfortsky®)

Vehicle pane C (PET IRR)
Clear glass/clear PVB/PET with IR-reflective coating/gray PVB/PET protective layer/PDLC/PET protective layer/clear PVB/dark gray glass Vehicle pane D (PET IRR HPS)
Clear glass/clear PVB/PET with highly IR-reflective coating/gray PVB/PET protective layer/PDLC/PET protective layer/clear PVB/dark gray glass Vehicle pane E (HPS+2× dark)
Clear glass/clear PVB/PET with highly IR-reflective coating/gray PVB/PET protective layer/PDLC/PET protective layer/gray PVB/dark gray glass Vehicle pane F (HPS, 2× d, Comfortsky®)
Clear glass/clear PVB/PET with highly IR-reflective coating/gray PVB/PET protective layer/PDLC/PET protective layer/gray PVB/dark gray glass+low-E (Comfortsky®)

Vehicle pane G (2× PLC, 2× d)
Clear glass/dark PVB/PET protective layer/PDLC/PET protective layer/dark PVB/clear glass (the dark PVB of the inner stack was darker than the dark PVB of the outer stack)

Vehicle pane H (2× PLC, 1× d)
Clear glass/dark PVB/PET protective layer/PDLC/PET protective layer/clear PVB/clear glass (this structure provides good thermal comfort)

Vehicle pane I (2× PLC)
Clear glass/clear PVB/PET protective layer/PDLC/PET protective layer/clear PVB/clear glass (standard structure for partition panels in motor vehicles)

For the vehicle panes A to G and the reference panes H and I, the transmittance levels TL(total) in the switched-on mode (transparent mode of the PDLC layer), TL(outside), TL(inside) and the ratio TL(outside)/TL(inside) were determined. The results are listed in the following table

TABLE

| No. | Pane | TL(total) [%] | TL(outside) [%] | TL(inside) [%] | TL(outside)/ TL(inside) |
|---|---|---|---|---|---|
| A | 2x VG10 | 7.4 | 28 | 28 | 1.0 |
| B | 2x VG10, Comfortsky | 7.2 | 28 | 27.4 | 1.0 |
| C | PET IRR | 6 | 22.9 | 8.7 | 2.6 |
| D | PET IRR HPS | 6.1 | 23.2 | 8.7 | 2.7 |
| E | HPS, 2x dark | 1.9 | 23.2 | 8.7 | 2.7 |
| F | HPS, 2x d, Comfortsky | 1.9 | 23.2 | 8.5 | 2.7 |
| G | 2x PLC, 2x d | 30 | 72.9 | 45.7 | 1.6 |
| H* | 2x PLC, 1x d | 7.6 | 9.3 | 90.5 | 0.1 |
| I* | 2x PLC | 74.4 | 90.8 | 90.8 | 1.0 |

*Reference panes

Prior art roof panels have a haze <1% which is increased to <3% by the use of a dark PVB. Through the use of PDLC, an opaque light source that both illuminates the vehicle interior evenly and also prevents glare for the occupants is obtained. As soon as the white PDLC film is illuminated by a light source, such as the sun, the PDLC scatters it. When occupants look at this white scattered light, they get a low-quality "plastic" visual impression.

When looking at the same PDLC film with the darker inner stack according to the invention and the same lighting conditions, a higher-quality discreetly gray impression was observed with the vehicle panes according to the invention in comparison to the reference panes H and I.

Prior art PDLC films have, in the transparent state, a haze between 2% and 16%. Films with low haze are generally suitable for use in vehicles. The dark polymeric laminated layers also increase the haze value. Thus, a complete structure can have as much as 10% haze. In direct comparison with light-colored panes (e.g., with 70% TL as with reference pane I), there is thus greatly increased haze, but the product according to the invention still has a more optically attractive effect.

Another difference arises when an external light source shines on the pane. With a prior art pane, the light is evenly scattered, specifically, for example, sunlight is scattered such that only a very small portion is deflected into the eye of the observer. This light interferes only slightly with vision toward the outside.

With the use of a PDLC pane, sunlight is scattered depending on the direction. In principle, when one moves away from the direction of the light with the viewing angle, the intensity of the scattered light decreases. However, there is a colored "halo" that represents an intensity maximum in the viewing-angle-dependent scattered light profile. Following this colored phenomenon, an intensely white scattered light is seen that only weakens at very large angles.

Looking at objects through PDLC panes with a customary structure is significantly disrupted, in this intensely white scattered light region, in particular. The intensity of the scattered light can exceed the light intensity of the object, as a result of which the white scattered light (white veil) outshines the colors of the object.

With the glass structure according to the invention having a dark inner layer, the intensity of the scattered light is particularly reduced. The colors of the object can still be discerned while looking at it. Despite higher haze and possibly darker overall structure in the vehicle panes according to the invention, the object appears more clearly than with the reference panes H and I.

With the vehicle panes according to the invention, the best overall optical impression or the greatest reduction of white haze and "plastic" impression was achieved with the panes A to F, and, in particular, with the panes C to F.

LIST OF REFERENCE CHARACTERS 1 outer glass pane
2 laminated layer
3 electrically conductive layer
4 PDLC layer
5 electrically conductive layer
6 laminated layer
7 inner glass pane
8 liquid crystal droplets
9 polymer matrix
10 incident light
10' scattered light
11 protective layer
12 protective layer
13 IR-reflective layer
14 frame
S switch (circuit open)
S' switch (circuit closed)
V voltage source

The invention claimed is:
1. A vehicle pane, comprising, in this order
a) an outer glass pane,
b) one or a plurality of laminated layers,
c) a PDLC layer, comprising a polymer matrix, in which liquid crystal droplets are embedded, and in each case an electrically conductive layer on both sides of the polymer matrix,
d) one or a plurality of laminated layers, and
e) an inner glass pane,
wherein a TL(inside) is in the range from 5 to 46% and a TL(outside) is in the range from 20 to 73% and the TL(outside) is greater than or equal to the TL(inside), wherein TL(inside) is the light transmittance of an inner stack that is formed by the inner glass pane and the layers between the PDLC layer and the inner glass pane, and the TL(outside) is the light transmittance of an outer stack that is formed by the outer glass pane and the layers between the PDLC layer and the outer glass pane, and
wherein the ratio TL(outside)/TL(inside) is in the range from 3 to 2.

2. The vehicle pane according to claim 1, wherein TL(inside) is in the range from 7 to 28% and/or TL(outside) is in the range from 24 to 40%.

3. The vehicle pane according to claim 1, wherein a protective layer is in each case arranged on both sides of the PDLC layer.

4. The vehicle pane according to claim 3, wherein the protective layer is a polyethylene terephthalate layer.

5. The vehicle pane according to claim 1, wherein at least two laminated layers are included between the outer glass pane and the PDLC layer, and an IR-reflective layer composed of a carrier layer and an IR-reflective coating situated thereon is arranged between the two laminated layers.

6. The vehicle pane according to claim 5, wherein the carrier layer is preferably a polyethylene terephthalate layer.

7. The vehicle pane according to claim 1, wherein the inner glass pane and/or the outer glass pane has a low-E coating.

8. The vehicle pane according to claim 7, wherein only the inner glass pane has a low-E coating.

9. The vehicle pane according to claim 1, wherein the laminated layers contain polyvinyl butyral, ethylene vinyl acetate, polyurethane, and/or mixtures thereof.

10. The vehicle pane according to claim 1, wherein at least one of the laminated layers is a tinted laminated layer.

11. The vehicle pane according to claim 10, wherein the tinted laminated layer is a gray laminated layer.

12. The vehicle pane according to claim 1, wherein the inner glass pane and/or the outer glass pane are selected from tinted glass panes.

13. The vehicle pane according to claim 12, wherein the tinted glass pane is a gray or dark gray glass pane.

14. The vehicle pane according to claim 1, wherein
the inner glass pane is a tinted glass pane and the outer glass pane is a clear glass pane, or
the inner glass pane is a tinted glass pane and the outer glass pane is a tinted glass pane.

15. The vehicle pane according to claim 1, wherein a light transmittance TL(total) of the entire vehicle pane in the switched-on mode is less than or equal to 30%.

16. The vehicle pane according to claim 1, wherein the vehicle pane is a motor vehicle pane.

17. The vehicle pane according to claim 1, wherein the vehicle pane is a sliding roof panel, a glass roof, a rear window, a rear side window, or a front side window, in a motor vehicle.

18. A vehicle, including a vehicle pane according to claim 1, wherein the vehicle is a motor vehicle.

* * * * *